(12) United States Patent
Cronin et al.

(10) Patent No.: US 10,275,953 B2
(45) Date of Patent: Apr. 30, 2019

(54) COST EFFECTIVE RIDE MAINTENANCE TRACKING SYSTEM AND METHOD THEREOF

(71) Applicant: Panasonic Intellectual Property Management Co., Ltd., Osaka (JP)

(72) Inventors: John Cronin, Bonita Springs, FL (US); Michael Glynn D'Andrea, Burlington, VT (US); Mikio Morioka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 84 days.

(21) Appl. No.: 15/478,736

(22) Filed: Apr. 4, 2017

(65) Prior Publication Data
US 2018/0286144 A1 Oct. 4, 2018

(51) Int. Cl.
| | | |
|---|---|---|
| G07C 5/00 | (2006.01) |
| A63G 31/00 | (2006.01) |
| G07C 5/08 | (2006.01) |
| A63G 7/00 | (2006.01) |

(52) U.S. Cl.
CPC ............. *G07C 5/008* (2013.01); *A63G 7/00* (2013.01); *A63G 31/00* (2013.01); *G07C 5/0866* (2013.01)

(58) Field of Classification Search
CPC ........ A62G 7/00; A62G 31/00; G07C 5/0866; G07C 5/008
See application file for complete search history.

(56) References Cited

U.S. PATENT DOCUMENTS

| | | | | |
|---|---|---|---|---|
| 6,553,336 | B1 * | 4/2003 | Johnson ................. | G01D 3/022 702/188 |
| 6,758,231 | B1 * | 7/2004 | Lochtefeld ............. | A63G 3/00 104/70 |
| 7,421,334 | B2 * | 9/2008 | Dahlgren ............... | G07C 5/008 340/989 |
| 2004/0193467 | A1 | 9/2004 | Williams et al. | |
| 2005/0216326 | A1 | 9/2005 | Inoue et al. | |
| 2006/0080158 | A1 * | 4/2006 | Schweizer ............. | A63G 7/00 700/9 |
| 2006/0136774 | A1 | 6/2006 | Nagafuchi et al. | |
| 2010/0026484 | A1 | 2/2010 | King et al. | |
| 2014/0121885 | A1 | 5/2014 | Schoonveld | |

FOREIGN PATENT DOCUMENTS

WO 2015/179696 A1 11/2015

* cited by examiner

*Primary Examiner* — Mussa A Shaawat
(74) *Attorney, Agent, or Firm* — McDermott Will & Emery LLP

(57) ABSTRACT

A system for tracking and evaluating ride maintenance includes: a management computer including a non-transitory processor and a memory in which a maintenance staff database and a ride maintenance database are stored; a ride condition detection system integrated with the management computer and including: a detector configured to record a video of the ride maintenance activity or an image of a target object at a certain time interval; and a control unit configured to communicate with the detector via a communication line, to detect the position change of the target object, and to store the video of the ride maintenance activity in the ride maintenance video database. The control unit has a memory to store ride condition database and ride maintenance video database.

20 Claims, 6 Drawing Sheets

COST EFFECTIVE RIDE MAINTENANCE TRACKING SYSTEM AND METHOD THEREOF

TECHNICAL FIELD

The present disclosure relates to a cost effective maintenance tracking system and a method thereof, and more particularly, to a cost effective ride maintenance tracking system capable of precisely assigning maintenance personnel and tracking maintenance results, and a method of using the same.

BACKGROUND

The number of visitors to amusement parks has been increasing each year, with a 5.1% increase from 2013 to 2014 in attendance with respect to visiting top 10 amusement parks in the United States, according to Themed Entertainment Association (TEA), and there are more than 400 amusement parks and attractions in the United States alone. As the number of people attending amusement parks increases, the importance of amusement park ride passenger safety significantly increases. Therefore, the amusement parks are required to monitor each ride and maintain regulatory guidelines to ensure passenger safety.

Accordingly, ride tracking systems have been developed to track motion, position, orientation, distance, etc. of rides to detect abnormality of the rides. For example, amusement parks generally have standard operating or maintenance procedures for routinely checking the condition of the rides by checking the motion, position, orientation, distance, etc. of rides.

In general, amusement parks conduct scheduled routine maintenance operations at certain time intervals for particular rides and the like. For example, a designated maintenance staff conducts part inspection, part replacement, etc. as required based on manufacturer recommendations or based on maintenance history data if available.

However, as unexpected problems may occur in any machine due to weather, accident, the amount of use, etc., there is a safety issue when an unexpected problem occurs in an amusement park ride. Accordingly, it is important to make sure that every ride in the amusement park complies with all safety requirements, and thus, non-routine maintenance operations are necessary.

In addition, maintenance staff member may be limited in their maintenance scheduling based on availability, and thus, scheduled maintenance may not satisfy safety requirements if the maintenance is delayed for an undesirably long period of time.

Further, it is difficult to verify whether the completed maintenance satisfies the safety requirements after the assigned maintenance staff member completes the maintenance work.

SUMMARY

To address the above problems, an object of the present disclosure is to provide a ride maintenance tracking system which tracks maintenance results and allows maintenance personnel to log in and share repairs currently being done, and a method of tracking ride maintenance providing the same. Another object of the present disclosure is to provide a ride maintenance tracking system which assigns maintenance personnel based on maintenance staff history data.

According to an exemplary embodiment of the present disclosure, a system for tracking and evaluating ride maintenance may include a management computer including a non-transitory processor and a memory in which a maintenance staff database and a ride maintenance database are stored; and a ride condition detection system integrated with the management computer. The ride condition detection system includes: a detector configured to record a video of a ride maintenance activity or a take an image of a target object at a certain time interval; and a control unit having a memory to store a ride condition database, and configured to communicate with the detector via a communication line and to detect a position change of the target object. A maintenance personal device (MPD) is wirelessly connected to the management computer. The management computer further includes a disk drive unit having a computer-readable medium in which one or more sets of instructions are embedded. The management computer causes the processor to perform steps of: identifying at least one ride condition using the ride condition detection system; and determining whether a maintenance operation is necessary by comparing the at least one ride condition with a reference condition stored in the ride maintenance database.

According to another exemplary embodiment of the present disclosure, a method for tracking and evaluating ride maintenance includes the steps of: identifying, by a ride condition detection system, at least one ride condition; and determining, by a maintenance tracking system, whether a maintenance operation is necessary by comparing the at least one ride condition with a reference condition. The management computer includes a non-transitory processor and a memory in which the maintenance staff database and the ride maintenance database are stored. The ride condition detection system is integrated with the management computer and includes a memory in which the ride condition database and the ride maintenance video database are stored. The ride condition detection system may include a detector configured to record a video of the ride maintenance activity or image of a target object at a certain time interval; and a control unit configured to communicate with the detector via a communication line and to detect the position change of the target object.

According to the exemplary embodiments of the present disclosure, it is possible to predict maintenance needs and the duration of downtime of the rides requiring maintenance. In addition, it is possible to provide proof of compliance to insurance companies and identify potentially dangerous deviations from maintenance procedures.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

It is to be understood that the following disclosure provides many different embodiments, or examples, for implementing different features of the invention. Specific embodiments or examples of components and arrangements are described below to simplify the present disclosure. These are, of course, merely examples and are not intended to be limiting.

Figure 1:
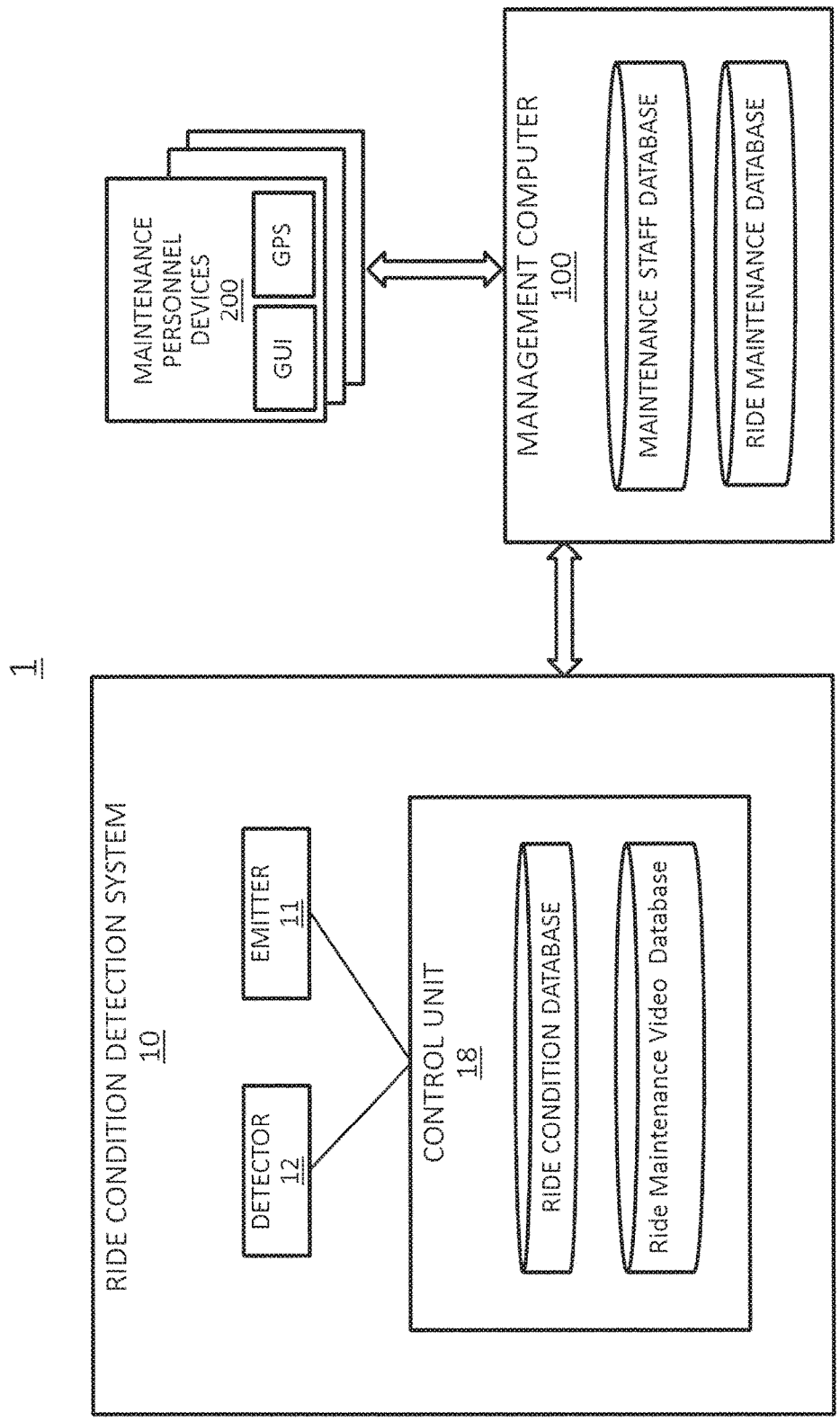
FIG. 1 is a diagram illustrating a ride maintenance tracking system according to an exemplary embodiment of the present disclosure.

Referring to FIG. 1, in the given embodiment, a ride maintenance tracking system 1 includes a ride condition detection system 10, a management computer 100, and one or more maintenance personal devices (MPD) 200 wirelessly connected to the management computer 100. The ride condition detection system 10 is integrated with or implanted within the management computer 100 and operates together, or communicates with each other over a network. The network may be the internet, a local area network, a cloud or any other suitable wireless network.

The ride condition detection system 10 includes a ride condition database and a ride maintenance video database stored therein, and the management computer 100 includes a maintenance staff database and a ride maintenance database stored therein.

Hereinafter, the above listed elements are described in detail with reference to FIGS. 1-3.

According to the given embodiment of the present disclosure, the management computer 100 is implemented with, for example, ride maintenance software, a ride condition monitor, a system administrator terminal, and/or a maintenance personal device, so as to perform functions as described in the various embodiments herein. The management computer 100 further includes a set of instructions that can be executed to cause the management computer 100 to perform any one or more of the methods or computer based functions disclosed herein. The management computer 100 operates as a standalone device or alternatively, can be connected, for example, using a network 101, to other computer systems or peripheral devices.

In a networked deployment, the management computer 100 operates in the capacity of a server or as a client user computer in a server-client user network environment, or as a peer computer system in a peer-to-peer (or distributed) network environment. The management computer 100 can also be implemented as or incorporated into various devices, such as a stationary computer, a mobile computer, a personal computer (PC), a laptop computer, a tablet computer, a wireless smartphone, a set-top box (STB), a personal digital assistant (PDA), a global positioning satellite (GPS) device, a communications device, a control system, a camera, a web appliance, a network router, switch or bridge, virtual reality (VR) system, augmented reality (AR) system, a kiosk or any other machine capable of executing a set of instructions (sequential or otherwise) that specify actions to be taken by that machine. In addition, the management computer 100 can be incorporated as or in a particular device that in turn is in an integrated system that includes additional devices. In a certain embodiment, the management computer 100 is implemented using electronic devices that provide voice, video and/or data communication. Further, while a single system 100 is illustrated herein, the term "system" shall also be taken to include any collection of systems or sub-systems that individually or jointly execute a set, or multiple sets, of instructions to perform one or more computer functions.

Figure 2:
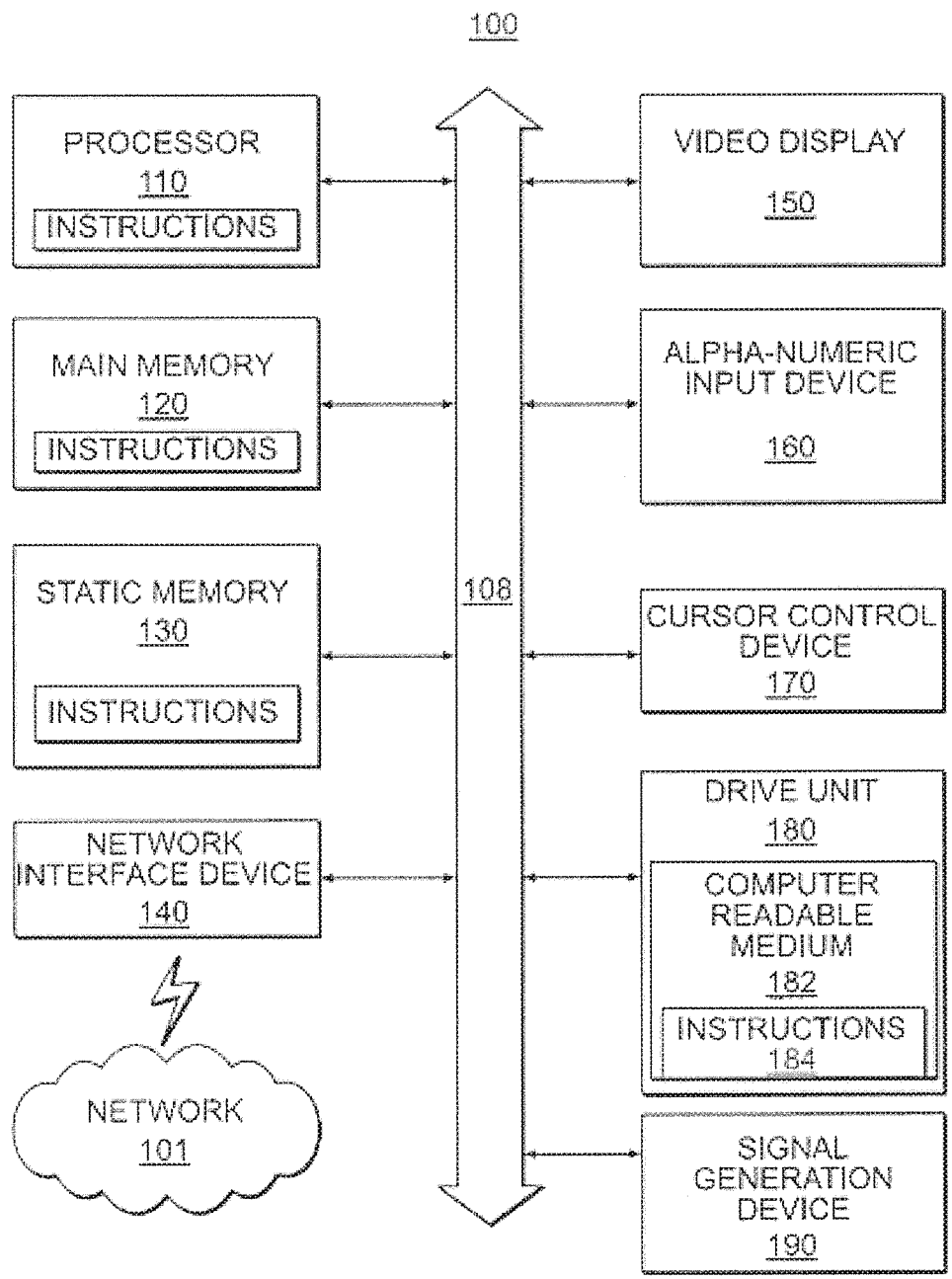
FIG. 2 is a diagram illustrating a management computer according to an exemplary embodiment of the present disclosure.
Figure 3:
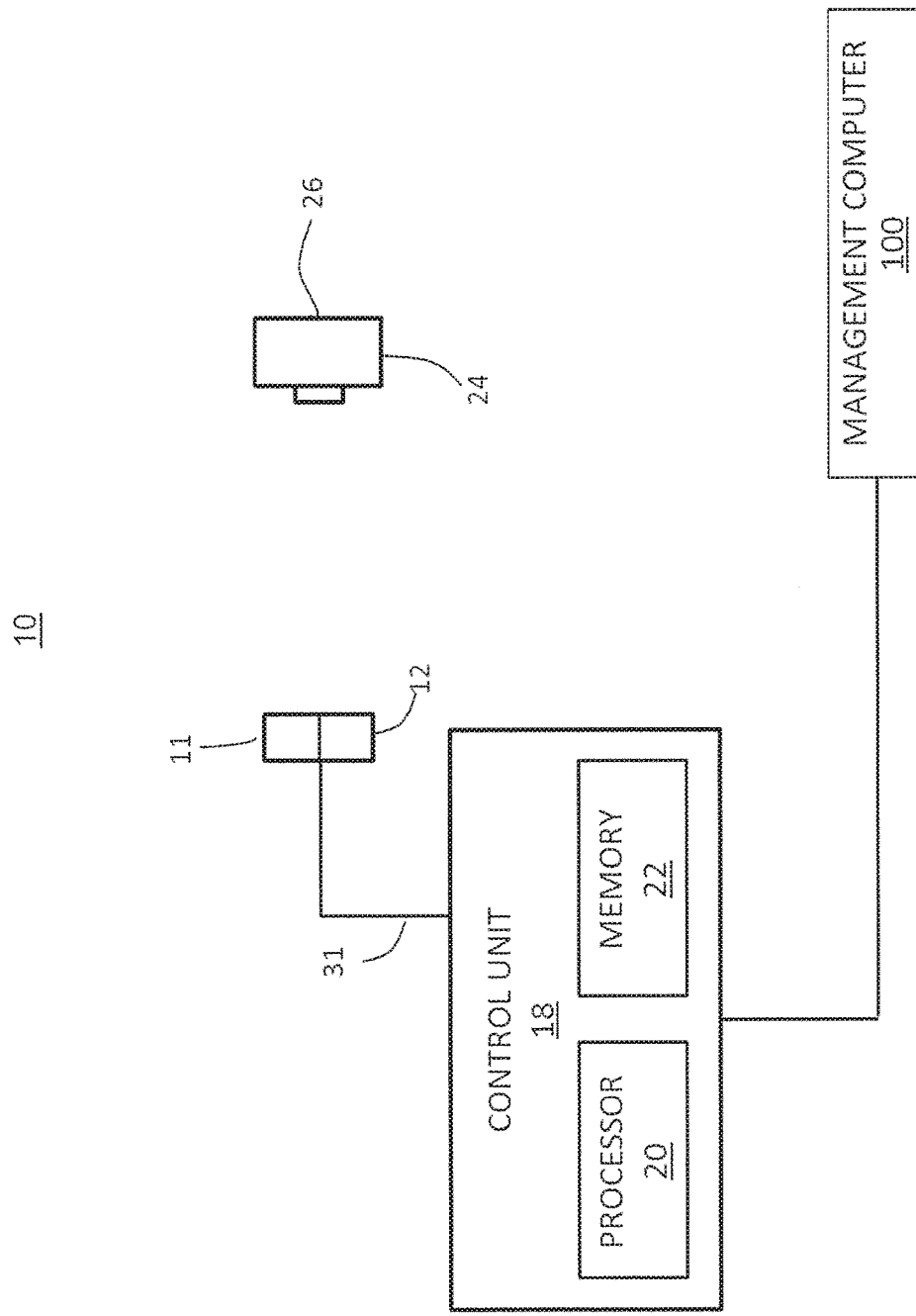
FIG. 3 is a diagram illustrating a ride condition detection system using a retroreflective marker according to an exemplary embodiment of the present disclosure.

As illustrated in FIG. 2, the management computer 100 further includes a processor 110. The processor 110 is configured to execute software instructions in order to perform functions as described in the various embodiments herein and may be a general purpose processor or may be part of an application specific integrated circuit (ASIC). The processor 110 may also be a microprocessor, a microcomputer, a processor chip, a controller, a microcontroller, a digital signal processor (DSP), a state machine, or a programmable logic device, and may also be a logical circuit, including a programmable gate array (PGA) such as a field programmable gate array (FPGA), or another type of circuit that includes discrete gate and/or transistor logic. Further, the processor 110 may be a central processing unit (CPU), a graphics processing unit (GPU), or both. Additionally, any processor described herein may include multiple processors, parallel processors, or both. Multiple processors may be included in, or coupled to, a single device or multiple devices.

The management computer 100 further includes a main memory 120 and a static memory 130 that can communicate with each other via a bus 108. Memories described herein are tangible storage mediums that can store data and executable instructions. Each of the memories 120 and 130 may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Here, the memories may be volatile or non-volatile, secure and/or encrypted, unsecure and/or unencrypted.

The management computer 100 may further include a video display 150, such as a liquid crystal display (LCD), an organic light emitting diode (OLED), a flat panel display, a solid state display, or a cathode ray tube (CRT). Additionally, the management computer 100 may include an input device 160, such as a keyboard/virtual keyboard or touch-sensitive input screen or speech input with speech recognition, and a cursor control device 170, such as a mouse or touch-sensitive input screen, pad, augmented reality input device, visual input device, video input device, 3D input device, human eye position input device, haptic input device, body tracking device, acoustic tracking device, or a data glove. The management computer 100 may also include a disk drive unit 180, a signal generation device 190, such as a speaker or remote control, and a network interface device 140.

According to an exemplary embodiment of the present disclosure, the disk drive unit 180 may include a computer-readable medium 182 in which one or more sets of instructions 184, e.g. software, can be embedded. The sets of instructions 184 can be read from the computer-readable medium 182. Further, the instructions 184, when executed by a processor, can be used to perform one or more of the methods and processes as described herein. In a certain embodiment, the instructions 184 may reside completely, or at least partially, within the main memory 120, the static memory 130, and/or within the processor 110 during execution by the management computer 100.

The present disclosure contemplates the computer-readable medium 182 that includes instructions 184 or receives and executes instructions 184 responsive to a propagated signal, so that the device connected to the network 101 can communicate voice, video or data over the network 101 via any of, for example, Near Field Communication (NFC), wired, Radio Frequency (RF), Radio-Frequency Identification (RFID), AirDrop, WiFi, Bluetooth, Bluetooth Low Energy (BLE), Active Bat, Zigbee, ANT, and Foundation Fieldbus H1. Further, the instructions 184 may be transmitted or received over the network 101 via the network interface device 140.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations.

The ride condition detection system 10, which communicates with the management computer 100, includes: an emitter 11 configured to emit electromagnetic radiation within a detection area 30 toward a target object 26 having a retroreflective marker; a detector 12 configured to detect the electromagnetic radiation reflected from the retroreflective marker; and a control unit 18 coupled to the emitter 11 and the detector 12 and configured to monitor the electromagnetic radiation detected by the detector 12. The control unit 18 may include a storage to store a ride condition database. In a certain embodiment, the detector 12 records a video of maintenance activity or an image of a target object at a certain time interval to monitor a ride condition without having a retroreflective marker.

In detail, the ride condition detection system 10 detects a position of the target object 26 by using the retroreflective marker which has a properly correlated retro-reflective material relative to a grid, pattern, the emission source, stationary or moving environment elements, or the like. For example, referring to FIG. 3, a marker 24 is provided on the target object 26 which may be any ride on a moving or stationary part in the amusement park. In a certain embodiment, a plurality of markers 24 are attached on each screw, legs, moving portions or stationary portions of the rides in the amusement park. The emitter 11 emits electromagnetic radiation toward the markers 24 at a certain time interval. Here, the emitter 11 is provided in plural to emit electromagnetic radiation to each marker 24. Then, the detector 12, which is located adjacent the emitter 11, detects the electromagnetic radiation reflected back to the emitter 11. The detector 12 may also be provided in plural to detect parts of each ride in the amusement park. The use of a retroreflective marker is well known in the art, and therefore, the detailed description thereof is omitted herein.

According to an exemplary embodiment in the present disclosure, the emitter 11 includes an infrared light bulb, one or more diode emitters, or the like, and the detector 12 includes a vision sensor, a camera, or the like.

When the detector 12 detects the reflected electromagnetic radiation, it may communicate with the control unit 18 through a communication line 31 by sending a signal indicating that the electromagnetic radiation is detected. Once the control unit 18 receives the signal, the control unit 18 stores measurement values at certain time intervals. For example, the detected electromagnetic radiation has a particular pattern or position, so that the control unit 18 stores a pattern or a position.

More particularly, the control unit 18 stores position values for each part in the amusement park continuously or at a certain time interval, thereby generating a ride condition database. The management computer 100, which communicates with the control unit 18, acquires such a ride condition database and compares with a reference value stored in the ride maintenance database. When the measured position value of a given part is beyond the reference value, the management computer 100 determines that a maintenance operation needs to be performed as a "non-routine maintenance action." In addition, the management computer 100 may also predict a future maintenance need using the ride condition database.

For example, referring to Table 1 below, the control unit 18 measures a sagging value of a specific part of a ride using the emitter 11 and the detector 12 every week at certain time. As the measurements indicate that the length of sagging increases by 1 mm each week, assuming the length of sagging must be maintained so as to be less than 5 mm (i.e., the reference value is 5 mm), the management computer 100 determines that the maintenance work has to be performed before Oct. 22, 2014, 1:00 pm, and then schedules the necessary maintenance.

TABLE 1

Ride Condition Database

| Length of Sagging | Date | Time |
| --- | --- | --- |
| 2 mm | Oct. 1, 2014 | 1:00 pm |
| 3 mm | Oct. 8, 2014 | 1:00 pm |
| . | . | . |
| . | . | . |

In a case in which a measured sagging value is out of range, the management computer 100 determines that a ride having the higher sagging value than the reference value, the management computer 100 communicates with the control unit 18 to temporarily stop operating the ride so as to ensure the passenger safety. Then, the management computer 100 schedules for an urgent repair need.

The various embodiments disclosed herein, the control unit 18 may be implemented using one or more processors 20 coupled to a memory (or other non-transitory machine readable recording medium) 22 storing computer-executable instructions for causing the processor(s) to perform the functions described above including the functions described in relation to the emitter 11 and the detector 12. Examples of computer readable media include, but are not limited to, Read-Only Memory (ROM), Random-Access Memory (RAM), compact disc (CD)-ROM, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a Controller Area Network (CAN). In some embodiments, the control unit 18 may form at least a portion of a control system configured to coordinate operations of various amusement park features.

Hereinafter, a method of acquiring and evaluating maintenance staff member will be described.

As described above, when the management computer 100 determines or predicts that a non-routine maintenance action is necessary based on the recorded ride condition database, it acquires the maintenance staff database stored therein. The maintenance staff database includes maintenance results for each staff member for a specific task. For example, the management computer 100 stores an available schedule for each staff member and also acquires an average period of time it takes to complete a specific task for each staff member stored in the control unit 18. The management computer 100 further receives image data obtained by recording video of each staff member performing the operation and compares the image data with a reference image stored in the ride maintenance database to analyze the maintenance result. In a certain embodiment, the detector 12 of the ride condition detection system 10 may record video continuously or as scheduled. As noted above, the detector 12 may include an image sensor or camera to take an image or video of a completed task and compare the image with the reference image. The images taken for each staff member are compared with the reference image and results may be represented as "good" when they match or "bad" when there is a discrepancy. Here, extracting an image from a recorded video is a well-known technology, and thus, the detailed description is omitted herein. The maintenance staff database can be updated on an ongoing basis as tasks are completed, and/or new staff members are added to the maintenance team.

In an exemplary embodiment of the present disclosure, the ride condition detection system 10, which includes the detector 12, captures still images or live videos while the assigned staff member performs the maintenance operation. The controller 18, which includes one or more processors 20, may process the images to determine an actual repair time and to store an image taken after the maintenance operation is completed. Then, the controller 18 compares the completed image with a reference image to determine whether there is a discrepancy. The process of determining the repair time will be further described.

Table. 2 below shows an exemplary maintenance staff database for each staff member. Here, the success rate is calculated based on the average results. For example, if staff member A has performed two maintenance operations for the same task, and the first result was "bad" or "0" and the second result was "good" or "1" based on the image comparison, the success rate for staff member A for that particular task is 50% as shown in Table 2 below. The maintenance staff database further stores an average time (hour) taken for each staff member to complete the repair task and as well as their current availability. The maintenance time is measured by recording video of each staff member performing the maintenance work or measured as the staff presses start and end buttons, on the MPD 200, indicating the start and end of the repair process. Only for convenience, the maintenance time, herein, represents a time measured by processing video data. For example, the control unit 18 having one or more processors 20 starts measuring a time only when a maintenance person is detected on the recorded video. Such a technology is well-known in the art, and therefore, the detailed description is omitted. The management computer 100 detects a maintenance staff member by a GPS signal of the MPD 200 and sends a signal to the control unit 18 to allow the detector 12 start recording, or the video starts recording based on a maintenance schedule.

TABLE 2

Maintenance Staff Database

| i | Staff | Success Rate | Average Maintenance Time | Availability |
|---|-------|--------------|--------------------------|--------------|
| 1 | C | 98% | 3.3 hr | Mon, Tue, Wed |
| 2 | B | 80% | 4.5 hr | M-F |
| 3 | A | 50% | 6 hr | Wed |
| . | . | . | . | . |
| . | . | . | . | . |
| . | . | . | . | . |

Figure 4:
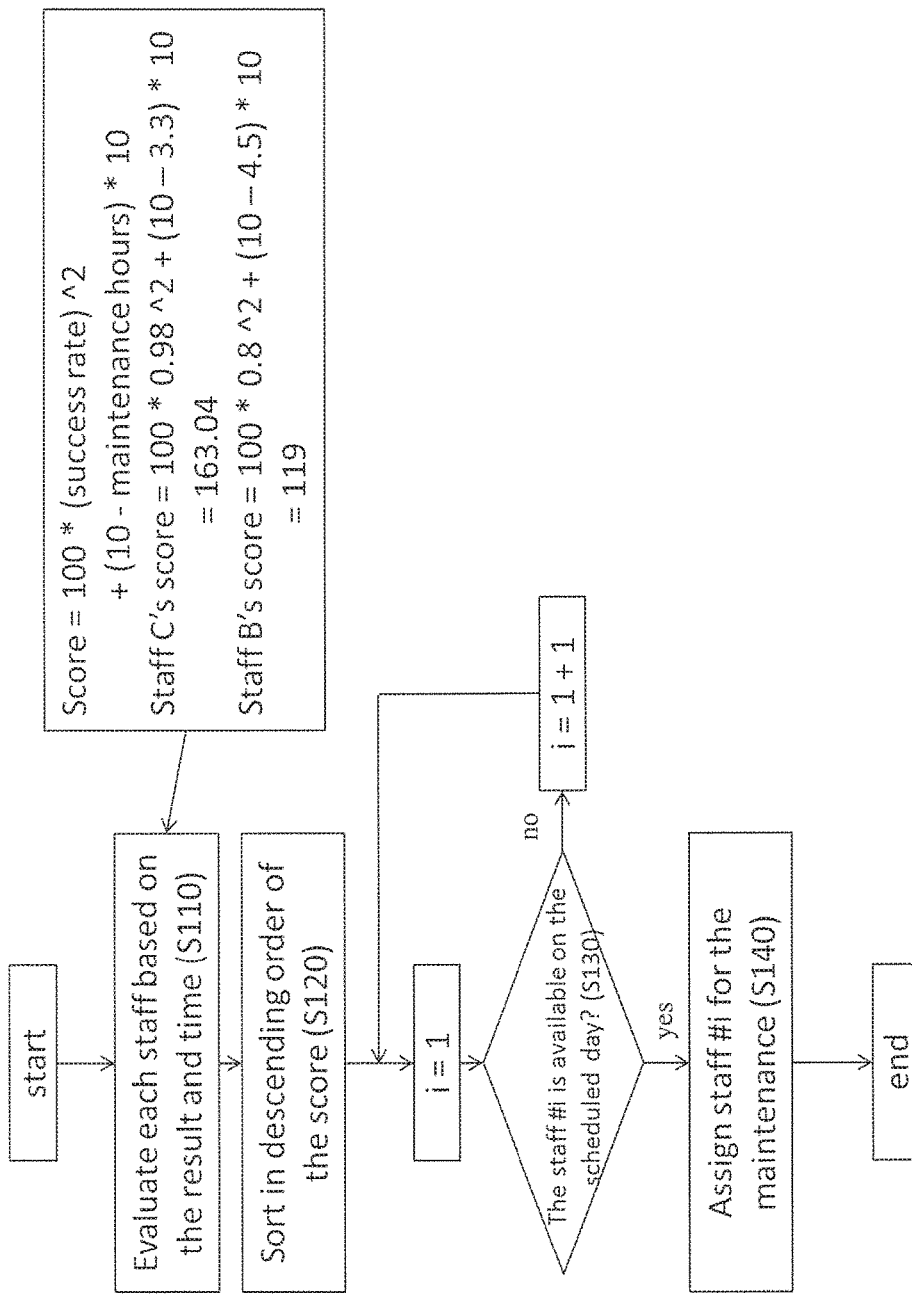
FIG. 4 is a flow chart illustrating a method of assigning a maintenance staff member according to an exemplary embodiment of the present disclosure.

FIG. 4 illustrates a process of assigning maintenance personnel using the ride maintenance tracking system according to an exemplary embodiment of the present disclosure. When the management computer 100 determines or predicts a maintenance need, the management computer 100 starts evaluating each staff member by scoring based on operation repair results and time to perform repair of each staff member using Equation 1 below (S110).

$$\text{Score} = 100 \times (\text{success rate})^2 + (10 - \text{avg. maintenance hours}) \times 10 \quad \text{Equation 1.}$$

As one example, with reference to Table 2 above, staff member C, who has a success rate of 98% and an average maintenance time of 3.3 hours, has a score of 163.04, while staff member B, who has a success rate of 80% and an average maintenance time of 4.5 hours, has a score of 119. After the score for each staff member is determined, the maintenance staff members are sorted by the scores in descending order (S120). Then, availability of the first staff member is determined in the determined order (S130). For example, if staff member C is available on a specific date based on the maintenance staff database, a maintenance task is assigned to staff member C (S130). If it is determined that staff member C is not available on the required date, the availability of the next staff, e.g., staff member B, is checked. Here, the determined order is represented by "i," in which i=1 is staff member C and i=1+1 is staff member B based on the maintenance staff database shown in Table 2.

Further, the management computer 100 generates a non-routine maintenance schedule in different ways. Referring to Table 3 below, based on maintenance history, it is possible to predict the next maintenance schedule date. For example, based on previous maintenance history for "abnormal noise inspection" shown in Table 3, the next maintenance schedule date is 84 days after Aug. 23, 2015 at 2:00 pm (since the interval between Jun. 1, 2015 and Aug. 23, 2015 is 84 days).

TABLE 3

Maintenance Schedule Based On Maintenance History

| Type of Maintenance | Date | Time |
|---------------------|------|------|
| Parts "A" replacement | May 12, 2015 | 1:00 pm |
| Abnormal Noise Inspection | Jun. 1, 2015 | 2:00 pm |
| Abnormal Noise Inspection | Aug. 23, 2015 | 2:00 pm |
| . | . | . |
| . | . | . |
| . | . | . |

In addition, the management computer 100 stores a routine maintenance database which is determined by manufacturers. Then, the management computer 100 compares all the maintenance schedules, that is, based on the measurement, maintenance history and/or manufacturer's recommended schedule, for each part/work, and selects the earliest date as a next maintenance schedule date.

The management computer 100 selects a maintenance staff member to meet the predicted maintenance schedule using the maintenance staff database. Here, the management computer 100 sends a signal to the MPD 200 which is wirelessly connected to the management computer 100. The MPD 200 may be a handheld mobile device, such as a cell phone, a smart phone, a PDA, a tablet computer or a laptop computer, provided to each maintenance staff member. The MPD 200 includes a device-side computer, a device-side GUI, a device-side storage, and a communication circuit.

Figure 5:
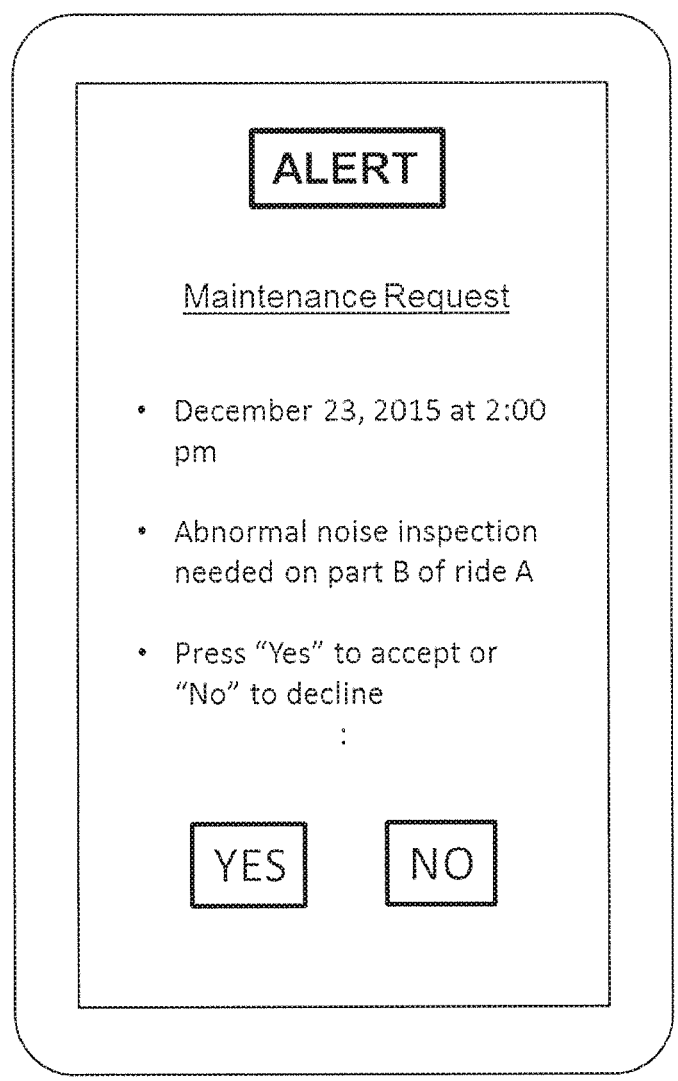
FIG. 5 is a screen view of a maintenance personal device (MPD) according to an exemplary embodiment of the present disclosure.

In a certain embodiment, the selected maintenance staff member receives a message on the MPD 200 from the management computer 100 requesting a maintenance work as shown in FIG. 5. The message includes detailed information on maintenance schedule date and time, a specific maintenance task, etc. Further, the message may ask the staff member whether to accept or decline the request. If the request is accepted, the selected maintenance staff member is assigned to perform the maintenance work. On the other hand, if the request is not accepted, the management computer 100 is notified and starts a new search for a maintenance staff member using the above-described process of assigning maintenance personnel.

Once an assigned maintenance staff member receives a maintenance request and accepts the request, he/she performs the operation on the scheduled date and the live performance may be recorded using the detector 12 to acquire a success rate as described above, and allow for updating of the maintenance staff database.

In addition, an image is taken after the assigned maintenance staff member completes the work using the detector 12 to be compared with a reference image stored in the ride maintenance database, in a similar way to obtain the success rate of each maintenance staff member. The control unit 18 sends the stored images to the management server 100 to compare with the reference image stored therein. If it is determined that there is a deviation, the management server 100 acquires a video of maintenance activity from the ride condition detection system 10 for further analysis and, if necessary, assuming the job was not performed satisfactorily, have the job immediately rescheduled so that repair is properly performed.

Figure 6:
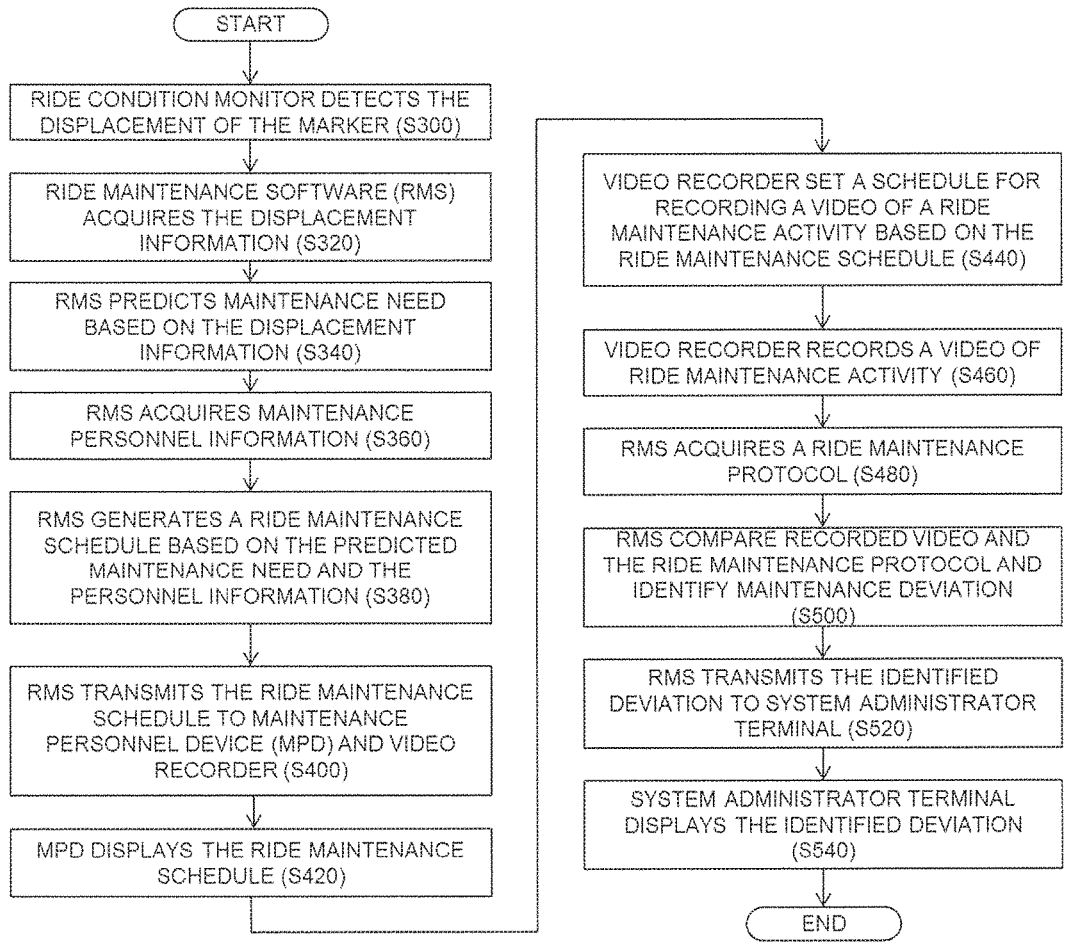
FIG. 6 is a flow chart illustrating a method of assigning a maintenance staff member and tracking a maintenance result according to an exemplary embodiment of the present disclosure.

FIG. 6 shows an exemplary flow chart illustrating a method of predicting a maintenance repair and searching for a maintenance staff member using the ride maintenance tracking system.

First, the ride condition detection system 10 detects whether there is a maintenance repair needed by measuring a position change of a part on a ride (S300). The measured value is compared with a reference value stored in a ride maintenance database to determine whether maintenance is necessary or to predict a future maintenance need (S320 and S340). The management computer 100 acquires a maintenance staff database (S360) when it is determined that the maintenance is necessary and generates a maintenance schedule based on the predicted maintenance need and the maintenance staff database (S380) to select a maintenance staff member to perform the repair. The selected maintenance staff member then receives a maintenance request with detailed information via the maintenance personal device 200 and either accepts or declines the request (S400 and S420). Once the selected maintenance staff member accepts the request, the management computer 100 sets a schedule for recording a video of the maintenance activity (S440), and the ride condition detection system 10, using the detector 12, records the video of the maintenance activity (S460). The management computer 100 acquires and processes the video data to determine, for example, a deviation between a reference image stored in the ride maintenance database and an image taken after the maintenance activity is completed (S480 and S500). If it is determined that there is a deviation, the management computer 100 identifies the issue for further investigation (S540).

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A system for tracking and evaluating ride maintenance, the system comprising:
   a management computer including a processor and a memory in which a maintenance staff database and a ride maintenance database are stored;
   a ride condition detection system integrated with the management computer and including:
      a detector configured to record a video of a ride maintenance activity or an image of a target object at a certain time interval; and
      a control unit having a memory to store a ride condition database and configured to communicate with the detector via a communication line and to receive the recorded video of the ride maintenance activity or image of the target object; and
   a maintenance personal device (MPD) wirelessly connected to the management computer,
   wherein the management computer causes the processor to perform steps of:
      identifying at least one ride condition using the ride condition detection system;
      determining whether a maintenance operation is necessary by comparing the at least one ride condition with a reference condition stored in the ride maintenance database; and
      when it is determined that the maintenance operation is necessary, automatically generating a ride maintenance schedule based on the maintenance staff database.

2. The system of claim 1, wherein the memory of the control unit stores a ride maintenance video database in which the video of the ride maintenance activity is stored.

3. The system of claim 2, wherein the management computer further causes the processor to further perform a step of:
   transmitting the generated ride maintenance schedule to the MPD.

4. The system of claim 3, wherein the processor further performs:
   setting a schedule for recording the video of the ride maintenance activity based on the generated ride maintenance schedule;
   acquiring the video of the ride maintenance activity at the set schedule from the ride condition detection system;
   acquiring a reference video from the ride maintenance database corresponding to the recorded ride maintenance activity video; and
   identifying at least one maintenance deviation by comparing the acquired reference video and the recorded ride maintenance activity video.

5. The system of claim 1, wherein the at least one ride condition includes a position change of the target object, and
   when the at least one ride condition is identified, the management computer generates the ride maintenance schedule by predicting a time when the at least one ride condition meets the reference condition.

6. The system of claim 1, wherein the detector includes a vision sensor.

7. The system of claim 1, wherein the maintenance staff database stores maintenance results including an average maintenance time, a success rate, and availability of each staff member.

8. The system of claim 4, wherein the ride condition database stores a position change of the target object based on the recorded image and the ride maintenance video database stores the ride maintenance activity at the set schedule.

9. The system of claim 1, wherein the MPD receives a maintenance request message from the management computer.

10. The system of claim 9, wherein the MPD is a handheld mobile device including a cell phone, a smart phone, a PDA, a tablet computer or a laptop computer, provided to each maintenance staff member, and
    wherein the MPD includes a device-side computer, a device-side GUI, a device-side storage, and a communication circuit.

11. The method of claim 7, wherein the success rate is calculated by comparing an image taken after each maintenance staff member completes maintenance operations with a reference image.

12. A method for tracking and evaluating ride maintenance, the method comprising steps of:
    identifying, by a ride condition detection system, at least one ride condition; and
    determining, by a maintenance tracking system, whether a maintenance operation is necessary by comparing the at least one ride condition with a reference condition;
    wherein the management computer includes a non-transitory processor and a memory in which a maintenance staff database and a ride maintenance database are stored,
    wherein the ride condition detection system is integrated with the management computer and includes a memory in which a ride condition database and a ride maintenance video database are stored, and
    wherein the ride condition detection system comprises:
       a detector configured to record a video of a ride maintenance activity or image of a target object at a certain time interval; and
       a control unit configured to communicate with the detector via a communication line and to detect a position change of the target object,
    wherein the method further comprises a step of:
    automatically generating, by the maintenance tracking system, a ride maintenance schedule based on the maintenance staff database when it is determined that the maintenance operation is necessary.

13. The method of claim 12, wherein the management computer compares the position change of the target object with a reference value stored in the ride condition database to determine whether a maintenance operation is necessary.

14. The method of claim 13, wherein the management computer predicts and generates the ride maintenance schedule based on position changes of the target object.

15. The method of claim 14, wherein the method further comprising:
    transmitting, by the maintenance tracking system, the generated ride maintenance schedule to the MPD.

16. The method of claim 12, wherein, in the step of generating the ride maintenance schedule, the maintenance tracking system compares each maintenance staff member and selects a maintenance staff member based on their scores calculated using an average maintenance time, a success rate, and availability for each maintenance staff member.

17. The method of claim 16, wherein the success rate is calculated by comparing an image taken after each maintenance staff member completes maintenance operations with a reference image.

18. The method of claim 12, wherein the step of transmitting the generated ride maintenance schedule includes sending a message requesting a maintenance operation message requesting whether to accept to the selected maintenance staff member.

19. The method of claim 18, wherein when the selected maintenance staff member accepts the maintenance operation request, the maintenance tracking system sets the schedule for recording the video of the ride maintenance activity.

20. The method of claim 12, further comprising:
    setting a schedule for recording the video of the ride maintenance activity based on the generated ride maintenance schedule;
    acquiring the video of the ride maintenance activity at the set schedule from the ride condition detection system;
    acquiring a reference video from the ride maintenance database corresponding to the recorded ride maintenance activity video; and
    identifying at least one maintenance deviation by comparing the acquired reference video and the recorded ride maintenance activity video.

* * * * *